(12) United States Patent
Kenny et al.

(10) Patent No.: US 7,592,406 B2
(45) Date of Patent: Sep. 22, 2009

(54) HINGE WITH INSULATED WIRE FOR ELECTRONIC DEVICES

(75) Inventors: Robert D. Kenny, Cincinnati, OH (US); Philip S. Smith, Hope Mills, NC (US); Patricia A. Tooley, Dickson, TN (US); Sundar Kilnagar Venkataraman, Avondale, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/973,528

(22) Filed: Oct. 9, 2007

(65) Prior Publication Data

US 2008/0090065 A1    Apr. 17, 2008

Related U.S. Application Data

(60) Provisional application No. 60/851,224, filed on Oct. 12, 2006.

(51) Int. Cl.
*C08F 14/18* (2006.01)
*C08F 114/18* (2006.01)
*C08F 214/18* (2006.01)

(52) U.S. Cl. .................................... 526/242

(58) Field of Classification Search ................. 83/947; 526/242–255; 428/292.1, 375; 361/680, 361/681
See application file for complete search history.

(56) References Cited

U.S. PATENT DOCUMENTS

| 4,029,868 | A  |   | 6/1977  | Carlson |
| 5,677,404 | A  |   | 10/1997 | Blair |
| 5,700,889 | A  | * | 12/1997 | Blair ........................... 526/247 |
| 7,130,591 | B2 | * | 10/2006 | Iwai et al. .................. 455/90.3 |
| 7,251,512 | B2 | * | 7/2007  | Komiyama ............... 455/575.3 |
| 2005/0230145 | A1 |   | 10/2005 | Ishii et al. |
| 2007/0013041 | A1 | * | 1/2007  | Ishigaki et al. .............. 257/686 |

FOREIGN PATENT DOCUMENTS

WO    WO2006/047678 A1    5/2006

* cited by examiner

*Primary Examiner*—Charlie Peng

(57) ABSTRACT

The combination of a hinge and an insulated wire is provided, wherein the hinge is capable of closing and opening to an angle of at least 90°, the insulated wire being secured by the hinge so as to fold when said hinge is closed and to unfold when said hinge is opened, the insulation on the wire comprising fluoropolymer, such as tetrafluoroethylene/-hexafluoropropylene copolymer or tetrafluoroethylene/perfluoro(methyl vinyl ether)/perfluoro(propyl vinyl ether) copolymer, each polymer having a melting point of 260 to 290° C. and MIT Flex Life of at least about 15,000 cycles, the hinge being useful in such electronic devices as a laptop computer or a clamshell cell phone, attaching the keyboard and screen portion to one another, the insulation being capable of repeated opening and closing of the hinge without cracking of the insulation.

6 Claims, No Drawings

HINGE WITH INSULATED WIRE FOR ELECTRONIC DEVICES

BACKGROUND OF THE INVENTION

1. Field of the Invention

This invention relates to fluoropolymer insulated wire secured by a hinge that can be folded repeatedly with the folding and unfolding of the hinge without the insulation on the wire cracking.

2. Description of Related Art

To enable wireless communication in laptop computers, such computers are equipped with multiple antenna wires. The antenna wires are each comprised of fine wire insulated with tetrafluoroethylene/-perfluoro(alkyl vinyl ether) copolymer, commonly known as PFA. The antenna wire is positioned within the screen display section (portion) of the computer and is soldered into a circuit board in the keyboard section (portion) of the computer. The antenna wire communicates from the screen display section to the keyboard section by passing through the hinge(s) that interconnects the two computer sections. The antenna wire must satisfy electrical requirements as well as use requirements. With respect to use requirements, the antenna wire must be able to withstand repeated folding as the laptop computer is closed and opened and have solder resistance. At least one laptop computer manufacturer tests the folding and unfolding of the antenna wire and has found that the PFA insulation withstands at least about 25,000 cycles before failure (cracking). According to ASTM D 4565-99 (reapproved 2004), the temperature of the solder pot used in soldering is about 320° C. and the solder time may take up to ten seconds and longer, depending on the bulk of the wire and the terminal to which the wire is being soldered. Soldering onto a terminal that already has soldered present lengthens the time to complete the solder attachment of the antenna wire. During exposure of the wire insulation adjacent to the solder site of the wire, the wire insulation must not melt and pull back from the solder site. Such shrink-back leaves exposed, uninsulated conductor, which can lead to electrical failure of the antenna wire. PFA satisfies the electrical requirement and has sufficient flex life to withstand the laptop use. PFA also has a very high melting temperature, of about 305° C., which is sufficient to resist shrink-back during soldering.

The problem is that the number of antenna wires in laptops is multiplying to keep pace with wireless requirements, and the cost of the PFA insulated wire to form the antenna wire is becoming excessive to the computer manufacturer. The manufacturer desires to use a less expensive antenna wire insulation that will satisfy both its electrical and use requirements. Tetrafluoroethylene/hexafluoropropylene(HFP) copolymer, commonly known as FEP, is less expensive than PFA and is known to satisfy the electrical requirements of the antenna use, but has a much lower melting temperature than PFA and lower flex life. Experiments with FEP in the course of the investigation leading to the present invention have found that FEP exhibits poor solder resistance, apparently arising from its much lower melting temperature, about 250-255° C., than the temperature of the molten solder. As the FEP insulation melts, it flows away from the heat source, i.e. pulls back from the heat source, leaving uninsulated, exposed wire, which is subject to electrical failure. These experiments have also found that as the polymer is polymerized to a lower molecular weight to enable a reasonably high extrusion wire coating rate, which is necessary to realize the economy of using FEP as the insulation for the antenna wire, the loss in flex life is drastic. Such FEP does not withstand the repeated folding of the laptop computer, i.e. insulation of this FEP cracks. Antenna wire insulated with this FEP has exhibited less than 10,000 cycles before the insulation cracks in the laptop computer manufacturer folding test.

The problem remains of how to provide the performance of the PFA-insulated antenna but at less cost.

SUMMARY OF THE INVENTION

The present invention solves this problem by providing the combination of a hinge capable of opening and closing, the opening being capable of forming an angle within the hinge of at least 90° and an insulated wire secured by said hinge so as to fold when said hinge is closed and to unfold when said hinge is opened, the insulation on said wire comprising fluoropolymer having a melting point of 260 to 290° C. and MIT Flex Life of at least about 15,000 cycles. This fluoropolymer satisfies both the electrical and use requirements for the insulation of antenna wire. It has been found that the fluoropolymer exhibiting this MIT Flex Life, tested on an 8 mil (0.2 mm) thick film, also exhibits a flex life of more than 20,000 cycles when tested as insulated wire according to the laptop computer manufacturers test, wherein the insulated wire is microcoaxial cable consisting of about 30 gauge (0.25 mm diameter) copper wire, polymer insulation thickness of about 10 mils (0.25 mm), a metal overbraid and a thin fluoropolymer jacket. The failure that occurs in the folding test is the cracking of the polymer insulation.

The foregoing described hinge/insulated wire combination is useful in electronic devices in general wherein the hinge interconnects two portions of the device, such as the keyboard portion and the screen portion of laptop computers and clamshell cell phones, wherein insulated wire secured by the hinge passes from one portion to the other, typically soldered at at least one end to provide the service desired from the insulated wire. In the case of such devices, the hinges enable the two portions to pivot with respect to one another thereby providing the capability of the device being opened and closed. The opening of the screen portion away from the keyboard portion causes a substantial unfolding of the insulated wire by virtue of the opening being at least 90°, this being the angle between the keyboard portion and the screen portion when the device is in the open position. Depending on the size of the device and the number of insulated wires passing from one portion of the device to the other, one or more hinges can be present, and individual insulated wires can be secured by at least one of these hinges. Alternatively a single hinge that is almost as wide as the width of the electronic device can be used instead of multiple hinges.

Examples of fluoropolymers which can be used as the insulation on the wire include tetrafluoroethylene/hexafluoropropylene copolymer and tetrafluoroethylene/perfluoro(methyl vinyl ether)/perfluoro(propyl vinyl ether) copolymer having the melting point (temperature) and MIT Flex Life indicated above. The melting point of these fluoropolymers is well below that of the PFA and yet shrink-back during soldering does not occur. The tetrafluoroethylene(TFE)/hexafluoropropylene(HFP) copolymer having a melting point of 260 to 270° C. is preferred. From the experience that FEP having a melting point of 250 to 255° C. exhibits severe pullback under that same soldering condition, it is especially surprising that the 260 to 270° C. melting point TFE/HFP copolymer does not suffer shrink-back during soldering.

The preferred TFE/HFP copolymer is that which has an HFP content of about 3.5-8 wt % (HFPI of about 1.09-2.5, calculation: wt % HFP=3.2×HFPI).

The conventional commercially available FEP having a melting temperature of 250-255° C. has an HFPI (Hexafluoropropylene Index) of at least about 3.1, which corresponds to an HFP content of at least about 10 wt %. The DuPont Company also has available tetrafluoroethylene/hexafluoropropylene copolymer grades G1 and G7, having melt flow rates (MFRs) of 1 and 7 g/10 min, respectively, and melting temperature of about 265° C., which have found a niche commercial utility as extruded film. The G7 copolymer is useful in the present invention, but has the disadvantage of low extrusion coating rate, characterized by a line speed (speed at the windup of the extrusion coated insulated wire) of about 125 m/min to make microcoaxial cable. The G7 copolymer exhibits an MIT Flex Life of greater than 15,000 cycles.

A preferred embodiment of the present invention is the invention of a new G copolymer wherein the TFE/HFP contents and melting point is the same as for the G7 copolymer, but the MFR is increased to at least about 10 g/10 min. Such increase in MFR is normally associated with reduced molecular weight, which in turn leads to reduced MIT Flex Life. Surprisingly, this higher MFR copolymer still exhibits satisfactory flex life to qualify as a replacement for the PFA copolymer as the insulation on antenna wire. Typically the MIT Flex Life of this novel copolymer, while being at least about 15,000 cycles, will not exceed about 25,000 cycles. The compositional range for this higher MFR TFE/HFP copolymer is an HFP content of about 3.5-8 wt % (HFPI of about 1.09-2.5), the remainder of the copolymer being TFE plus some small amount of termonomer, if present. The performance of this copolymer in microcoaxial cable for antenna wire for such electronic devices as a laptop computer indicates more widespread application of the copolymer in other devices, such as clamshell cell phones, requiring repetitive opening and closing via one or more hinges, through which the insulated wire runs. This copolymer is also capable of extrusion wire coating at higher line speed than the G7 copolymer to make microcoaxial cable, namely line speeds of at least about 200 m/min.

Another embodiment of the present invention is the insulated wire secured by the hinge or by itself as antenna wire comprising wire insulated with the fluoropolymers described above having a melting point of 260 to 290° C. and MIT Flex Life of at least about 15,000 cycles or the more specific copolymers described above having these attributes or more specific attributes therewithin.

DETAILED DESCRIPTION OF THE INVENTION

The hinge in the hinge/insulated wire combination of the present invention and in electronic devices containing one or more of such hinges can be any jointed device that allows the pivoting of a part such as a lid, which in many electronic devices is the screen portion of the device, away from the other part of the device. The hinge can be a discrete article, which would be attached to the electronic device or can be made as an integral part of portions of the electronic device. The present invention contemplates the use of any hinge construction that provides the opening and closing function, and any suitable material of construction of the hinge can be used. For example, the material of construction of the hinge in many electronic devices will either be metal or plastic or a combination of metal and plastic.

The insulated wire is secured by the hinge having a channel through the pivot area of the hinge, through which the insulated wire can pass from one portion of the electronic device to the other portion thereof, e.g. from the keyboard portion to the screen portion of the laptop computer or the clamshell telephone. The insulated wire can be entirely or partially buried within the hinge, i.e. the channel within the hinge can be totally or partially hidden from exterior view. The function of the channel is to secure the insulated wire in a manner that it is safe from mechanical abuse and will move with the opening and closing of the hinge, this movement causing an unfolding of the insulated wire and then its folding, respectively.

Hinges with channels for securing wires running between screen and keyboard portions of laptop computers and clam shell cell phones are already used and available in the market. The present invention provides the improvement of the particular insulated wire being secured by the hinge, the improvement being lower cost, while providing satisfactory electrical properties, flex life and solder resistance. Especially the higher MFR TFE/HFP copolymer described above has the additional economy advantage of enabling a higher line speed to be attained in the manufacture of the insulated wire.

One embodiment of insulated wire for use in the present invention is coaxial cable, especially the microcoaxial cable characterized by a wire gauge of at least 26 (400 μm diameter), more typically 28-34 gauge (320-160 μm diameter), fluoropolymer insulation on and around the wire and having a thickness of at least 10 mils (0.25 mm), typically 10 to 25 mils (0.25 to 0.63 mm), having a wire braided overlay onto the insulation and a polymer jacket overlaying the braid.

For soldering, a small length of the insulation, wire braid and jacket are stripped away to expose the suitable length of wire conductor to be soldered to an electrical component. Both ends of the insulated wire can be so-prepared, for soldering at both ends. The solder from the solder pot at a temperature cools somewhat during application to the bared wire conductor and the terminal to which it is to be soldered. Especially in the case of soldering to a preexisting solder, which presents a relatively large mass to be heated to solder temperature, the solder time is long, e.g. 8-14 sec. During this time of exposure of the cut-back wire insulation, the fluoropolymer insulation does not exhibit any appreciable shrink-back. In some soldering applications, shrink-back up to 0.2 mm is acceptable, and in other applications, shrink-back up to 0.5 mm is tolerable. The fluoropolymers used in the present invention typically have no perceptible shrink-back, and in any event satisfy these small amounts of shrink-back.

This is in contrast to when FEP having a melting point of 250-255° C. is used as the wire insulation, wherein insulation shrink-back is severe and electrically unacceptable.

The fluoropolymer used in the present invention can be made by conventional polymerization methods but is preferably made by polymerization in a medium comprising carbon dioxide ($CO_2$) when the copolymer is the TFE/HFP copolymer. This polymerization is disclosed in U.S. Pat. No. 6,051,682. This polymerization is distinguishable from conventional polymerizations to make FEP in an aqueous medium or in a halocarbon solvent polymerization medium, because neither polymerization medium is present when the $CO_2$ medium method is used to make the copolymer used in the present invention, i.e. the copolymer made in the $CO_2$ medium is made (polymerized) without using aqueous or halocarbon polymerization medium. The polymerization initiator used in the polymerization in the $CO_2$ medium is a nonionic organic compound, preferably one which forms stable end groups, i.e. end groups that are perfluorocarbon or perfluoro(alkyl ether), instead of an inorganic salt (ionic species) of the type that is typically used in the aqueous dispersion polymerization process. Thus, the copolymer used in the present invention can be made without ionic initiator. Dispersing agent that is present in the typical aqueous dispersion polymerization process to form FEP is not present in the polymerization process using $CO_2$ as the polymerization medium. Thus, the copolymer used in the present invention can be made without the use of dispersing agent.

Small amounts of halocarbon diluent may be introduced in the polymerization as diluent for the nonionic initiator, though it is more preferable that $CO_2$ be the initiator diluent, as is disclosed in U.S. Pat. No. 6,395,937. By halocarbon diluent is meant fluids, nonpolymerizable by free radical polymerization, such as fluorocarbons, chlorofluorocarbons, hydrofluorocarbons, and hydrofluorochlorocarbons. When such diluent is present, its amount is preferably less than 2 wt % based on the total weight of the $CO_2$ polymerization medium including the halocarbon diluent, more preferably less than 1 wt %, and most preferably, no halocarbon diluent at all. The small amount of halocarbon diluent that may be present in the $CO_2$ polymerization medium does not form a continuous phase within which polymerization can occur and thus is not the polymerization medium.

The tetrafluoroethylene(TFE)/hexafluoropropylene (HFP) copolymers used in and of the present invention have a low content of HFP as indicated by the HFPI of about 1.09 to 2.5. HFPI is the ratio of infrared (IR) absorbances, which is converted to wt % by multiplying the IR ratio by 3.2, as disclosed in U.S. Pat. No. 5,677,404. As the HFPI increases from 2.5, the melting temperature of the copolymer falls, resulting in shrink-back of wire insulation made from the copolymer during soldering. The HFPI of at least 1.09 is required to give the copolymer melt flowability, as distinguished from polytetrafluoroethylene which does not flow in the molten state. The copolymers used in and of the present invention can also contain a small amount of other copolymerized monomer to improve properties. The preferred TFE/HFP copolymer is TFE/HFP/PAVE, wherein PAVE (perfluoro(alkyl vinyl ether)) is perfluoro(ethyl vinyl ether) (PEVE) or perfluoro (propyl vinyl ether) (PPVE). PAVE content is about 1.2 to 2 wt % based on the total weight of the copolymer. The determination of PAVE content will depend on the monomer. Analysis for PEVE is disclosed in U.S. Pat. No. 5,677,404 and for PPVE, in U.S. Statutory Invention Registration H130, published Sep. 2, 1986. The preferred copolymer composition is about 3.5 to 8 wt % HFP, about 1.2 to 2 wt % PAVE, with the remainder being TFE to total 100%.

The melting temperature of the copolymer of the present invention is higher than commercially available FEP, and this is important in accomplishing the necessary solder resistance when the copolymer is used as wire insulation. Preferably, the melting temperature is at least 262° C. As the melting temperature increases from 270° C., the physical properties, e.g. flex life, deteriorate. Melt temperature is determined in accordance with ASTM D 4591-87 and is the peak temperature of the endotherm on second melting (second heat).

The melting temperature for the TFE/perfluoro(methyl vinyl ether)/perfluoro(propyl vinyl ether) copolymer is generally higher than for the TFE/HFP copolymer. Generally, this co-vinyl ether copolymer will contain 0.5 to 13 wt % of the perfluoro(methyl vinyl ether) and 0.5 to 3 wt % of the perfluoro(propyl vinyl ether), the remainder to total 100 wt % being TFE. This copolymer has been referred to by the manufacturer as MFA.

The preferred fluoropolymers are the perfluoropolymers, i.e. polymers in which substantially all the monovalent atoms on the polymer backbone (or main chain) are fluorine atoms. At the ends of the polymer chain, other monovalent atoms may be present. These ends, also known as end groups may contain atoms or groups of atoms characteristic of the initiator and/or of chain transfer reactions, and/or post-polymerization stabilization treatments, such as fluorination, or humid heat treatment. These stabilizing treatments can be used in the preparation of the fluoropolymers used in the present invention, although the copolymer prepared by polymerization in carbon dioxide medium typically does not require any end-group stabilizing treatment.

The MIT Flex Life is determined in accordance with ASTM D 2176 on an 8 mil (0.2 mm) thick compression molded film as disclosed in U.S. Pat. No. 4,029,868. It has been found that this test is an indicator that the insulated wire will satisfy the repetitive folding and unfolding requirement for the insulated wire used as antenna wire in laptop computers. Preferably, the MIT flex life of the copolymer is at least 18000 cycles. The MIT Flex Life of 25,000 cycles is about one-half of the MIT Flex Life of the copolymer polymerized to have an MFR of 7 g/10 min, indicating the profound influence of increasing the MFR of the copolymer from 7 to at least about 10 g/10 min. MFR is an indicator of the melt flowability of the copolymer, and is the measurement of the rate that molten polymer flows through an orifice under a given load, as determined in accordance with the disclosure in U.S. Statutory Invention Registration H130, which refers to ASTM D 1238-52T and ASTM D 2116-81 to define the equipment parameters, including the 5 kg weight used to force the molten polymer through the orifice, and the melt temperature of 372° C.

The copolymer of the present invention is extrusion coated onto wire by conventional melt-draw-down extrusion at a line speed of at least 200 m/min. Line speed is the speed at windup of the extrusion applied—insulated wire onto a reel.

EXAMPLE

The reactor temperature is about 70° C., reactor pressure is 1800 psig (12.5 MPa). The feed to the reactor is 12.0 kg/hr. The feed composition is 59.3 wt % hexafluoropropylene (HFP), 16.5 wt % tetrafluoroethylene (TFE), 1.6 wt % perfluoro(ethyl vinyl ether) (PEVE), 22.6 wt % carbon dioxide ($CO_2$). The feed also contains 120 ppm ethane as chain transfer agent. The initiator is HFPO dimer peroxide ($CF_3CF_2CF_2$—O—$CF(CF_3)C(O)O$—$OCOCF(CF_3)$—O—$CF_2CF_2CF_3$). The initiator is 20 wt % in diluent (Vertrel® XF, which is 2,3-dihydrodecafluoropentane). The initiator feed rate is 2 g of HFPO dimer peroxide per hour. Under these conditions, polymer production rate is 436 g/hr. The polymer composition is 7.4 wt % HFP (calculated from HFPI of 2.31× 3.2) and 1.5 wt % PEVE, the remainder to total 100 wt % being TFE. Melt flow rate (MFR) is 10.8 g/10 min. The polymer melting point is 268° C. The acid fluoride endgroups on the polymer are 31 per million carbon atoms. No —$CONH_2$ and —COOH groups are detected. Analysis for olefin (—CF=CF2) end groups is also made and none are detected. The monomers, $CO_2$, and HFPO dimer peroxide and a small amount of its diluent (about 1 part per thousand of monomer and $CO_2$ feed) are the only ingredients present in the polymerization system, whereby there is no halocarbon solvent polymerization medium, no dispersing agent, and no inorganic salt (ionic species). Polymer and reaction medium are continuously withdrawn from the reactor, the polymer is separated from the medium, being obtained in the form of free-flowing powder, which can be used directly in melt processing. The copolymer exhibits an MIT Flex Life of 16,700 cycles.

The copolymer prepared in the preceding paragraph is extruded onto 28 gauge (320 µm diameter) copper wire using conventional commercial extrusion equipment and extrusion conditions by the melt draw-down technique at a line speed of 225 m/min, which is about twice the line speed that could be used when the MFR of the copolymer is 7 g/10 min.

The extrusion process is described in DuPont's Melt Extrusion Guide, publication no. H-45321.

The resultant insulation coated wire is then covered with wire braid and an extrusion-applied polymer jacket. This microcoaxial cable exhibits repetitive folding and unfolding in the laptop computers manufacturer's test of greater than 20,000 cycles without cracking of the insulation, indicating its acceptability as through-the-hinge antenna wire in laptop computers and in other electronic devices having repetitive opening and closing.

The invention claimed is:

1. The combination of a hinge capable of opening and closing, the opening being capable of forming an angle within the hinge of at least 90° and an insulated wire secured by said hinge so as to fold when said hinge is closed and to unfold when said hinge is opened, said insulated wire having insulation comprising a fluoropolymer selected from (a) tetrafluoroethylene/perfluoro(methyl vinyl ether)/perfluoro(propyl vinyl ether) copolymer, or (b) tetrafluoroethylene/hexafluoropropylene copolymer having a hexafluoropropylene content of about 3.5-8 wt % (HFPI of 1.09-2.5) and melt flow rate of at least about 10 g/10 min, said fluoropolymer having a melting point of 260 to 290° C. and MIT Flex Life of at least about 15,000 cycles, said insulated wire exhibiting shrink-back of said insulation of 0.5 mm or less upon soldering.

2. The combination of claim 1 wherein said insulation comprises tetrafluoroethylene/hexafluoropropylene copolymer having a melting temperature of about 260-270° C.

3. An electronic device comprising a keyboard portion, a screen portion, at least one hinge attaching said screen portion to said keyboard portion, each said hinge enabling said screen portion to be closed against said keyboard portion and said screen portion to be opened by an angle of at least 90° from said keyboard portion, and an insulated wire secured by at least one of said hinges so as to fold when said hinge is closed and to unfold when said hinge is opened, said insulated wire having insulation comprising a fluoropolymer selected from (a) tetrafluoroethylene/perfluoro(methyl vinyl ether)/perfluoro(propyl vinyl ether) copolymer, or (b) tetrafluoroethylene/hexafluoropropylene copolymer having a hexafluoropropylene content of about 3.5-8 wt % (HFPI of 1.09-2.5) and melt flow rate of at least about 10 g/10 min, said fluoropolymer having a melting point of 260 to 290° C. and MIT Flex Life of at least about 15,000 cycles, said insulated wire exhibiting shrink-back of said insulation of 0.5 mm or less upon soldering.

4. The electronic device of claim 3 wherein said device is a laptop computer or a clamshell cell phone.

5. The electronic device of claim 3 wherein said insulated wire is antenna wire.

6. Antenna wire comprising insulated wire having insulation comprising tetrafluoroethylene/hexafluoropropylene (HFP) copolymer having an HFP content of about 3.5-8 wt % (HFPI of 1.09-2.5), a melting temperature of about 260-270° C., an MFR of at least about 10 g/10 min, and an MIT Flex Life of at least about 15,000 cycles and not to exceed about 25,000 cycles, said insulated wire exhibiting shrink-back of said insulation of 0.5 mm or less upon soldering.

* * * * *